United States Patent
Giannakakos et al.

(10) Patent No.: US 7,862,283 B2
(45) Date of Patent: Jan. 4, 2011

(54) TANGED SCREW THREAD INSERT WITH IMPROVED REMOVABILITY

(75) Inventors: William Giannakakos, Danbury, CT (US); William J Lutkus, Watertown, CT (US); John F Carvalho, Danbury, CT (US)

(73) Assignee: Newfrey LLC, Newark, DE (US)

( * ) Notice: Subject to any disclaimer, the term of this patent is extended or adjusted under 35 U.S.C. 154(b) by 1146 days.

(21) Appl. No.: 11/095,713

(22) Filed: Mar. 31, 2005

(65) Prior Publication Data

US 2006/0222476 A1    Oct. 5, 2006

(51) Int. Cl.
*F16B 37/12*    (2006.01)
(52) U.S. Cl. ............... 411/438; 411/929.1; 411/178
(58) Field of Classification Search ............ 411/438, 411/929.1, 178
See application file for complete search history.

(56) References Cited

U.S. PATENT DOCUMENTS

| | | | | | |
|---|---|---|---|---|---|
| 2,390,514 | A | * | 12/1945 | Cram | 411/438 |
| 2,586,007 | A | * | 2/1952 | Cram et al. | 411/438 |
| 3,177,782 | A | * | 4/1965 | Sampson | 92/255 |
| 6,146,073 | A | * | 11/2000 | Kobusch | 411/178 |
| 6,171,040 | B1 | * | 1/2001 | Sato | 411/178 |
| 6,588,305 | B2 | * | 7/2003 | Giannakakos et al. | 81/441 |
| 6,726,421 | B2 | * | 4/2004 | Giannakakos et al. | 411/438 |
| 2003/0049096 | A1 | * | 3/2003 | Giannakakos et al. | 411/438 |

FOREIGN PATENT DOCUMENTS

| EP | 0140812 A1 | 5/1985 |
|---|---|---|
| EP | 0992694 A1 | 4/2000 |

OTHER PUBLICATIONS

European Search Report dated Jun. 26, 2006 re EP Application No. 06111996.2.

* cited by examiner

*Primary Examiner*—David Reese
(74) *Attorney, Agent, or Firm*—Harness, Dickey & Pierce, P.L.C.

(57) ABSTRACT

A helical-shaped insert to engage a threaded fastener to a receiving member includes a helical coil having a plurality of coil sections having inner and outer surfaces forming a thread shape, and opposing first and second coil end sections. A removable tang extends radially inward from the first coil end section. A continuously curved surface at a finished end of the second coil end section forms a tangent point where the continuously curved surface tangentially meets the second coil end section outer surface. A notch in the first coil end section proximate to the tang and positioned between the inner and outer surfaces permits removal of the tang by mechanical failure at the notch. A second notch in the second coil end section and the continuously curved surface assist coil removal.

15 Claims, 4 Drawing Sheets

TANGED SCREW THREAD INSERT WITH IMPROVED REMOVABILITY

FIELD OF THE INVENTION

The present invention relates in general to thread insert members and more specifically to helical coil shaped thread inserts insertable into an aperture of a relatively soft material to provide a female thread for subsequent insertion of a screw or bolt.

BACKGROUND OF THE INVENTION

Thread inserts having a generally helical shape are commonly used to create a receiving thread for subsequent insertion of a screw or bolt into a relatively soft receiving material such as polymeric material or soft metals such as aluminum or magnesium, etc. An aperture is pre-tapped in the receiving material to receive the helical insert. The helical insert or "coil" includes a plurality of both outside and inside surface areas acting as screw threads. A tang which is an extension of the coil extends radially inwardly from a coil section at a leading end of the coil and is provided for grasping by an insertion tool. Using the insertion tool and tang, the coil is threaded into the aperture, the coil outer surfaces engaging the tapped threads of the aperture. The tang can then be broken off by material failure at a notch pre-formed at a junction of the tang and the helical coil. The coil inner surfaces then provide engagement surfaces for receiving the threads of a screw, bolt or other fastener.

Known helical coil designs provide retention strength or resistance to removal by sheared ends provided at both ends of the coil which bite into the softer receiving material when removal of the coil is attempted or a fastener is rotated into the coil. To further improve coil retention, "insert ends" having no chamfers together with the sheared ends are used. Removal of coils is often required, for example to remove and/or replace the fastener during maintenance, or if the coil is damaged or is installed improperly. During coil removal, the softer receiving material is susceptible to damage. When the receiving material is a casting or complex part, the cost to replace the damaged part can be excessive.

Coil designs are known which assist in removal of the coil, for example U.S. Pat. No. 6,171,040 to Sato. Sato discloses a pair of notches 10 which are formed at a back end portion of the coil and include contact surfaces 10b for engagement by a tool such as a bladed screw driver. At the back end of the coil, Sato also discloses a center flat surface 20 having chamfered surfaces 15, 16, 17 and 18. The disadvantage of the Sato and other known designs is that damage to the internal threads of the receiving material aperture can still occur when the coil is backed out, due to the corners of the chamfer geometry at the back end of the coil.

SUMMARY OF THE INVENTION

According to one preferred embodiment, a tanged screw thread insert with improved removability of the present invention includes a helical-shaped insert having a plurality of coil sections, including opposing first and second coil end sections. A continuously curved surface is created at a rounded distal end of the second coil end section. A tangent point is created where the curved surface tangentially meets an outer surface of the second coil end section.

According to another preferred embodiment, a thread insert includes a helical-shaped insert defining a plurality of coil sections including opposing first and second coil end sections. The coil sections each have an inner surface and an outer surface, the inner and outer surfaces each having a thread shape. The outer surface of each of the coil sections are aligned to create a substantially constant diameter coil body. A removable tang extends radially inward from the first coil end section. A continuously curved surface is created at a rounded distal end of the second coil end section. A tangent point is created where the curved surface tangentially meets the outer surface of the second coil end section. A first notch is disposed in the first coil end section proximate to a tang connection and positioned between the inner and outer surfaces. The first notch is operable to create a failure point in the first coil end section for removal of the tang. A second notch is created in the second coil end section proximate to the continuously curved surface, the second notch having a contact surface operable to assist in removal of the insert from an installed position.

According to yet another preferred embodiment, a method for creating a thread insert, the thread insert including a helical-shaped coil defining a plurality of coil sections including opposing first and second coil end sections and an outer coil diameter, includes creating a continuously curved surface at a rounded distal end of the second coil end section. The method further includes blending the continuously curved surface tangentially into an outer surface of the second coil end section to operably create a tangent point.

A tanged screw thread insert with improved removability of the present invention provides several advantages. By retaining a substantially constant outside diameter of the individual coil segments, removal of the coil presents a substantially constant contact diameter against the threads of the receiving member, which reduces the possibility of an out-of-round coil segment causing frictional damage to the threads. By providing a continuously curving end surface at a distal end of the coil second end segment, a smooth surface is presented during removal of the insert which reduces the chance of frictional damage to the threads of the receiving member.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
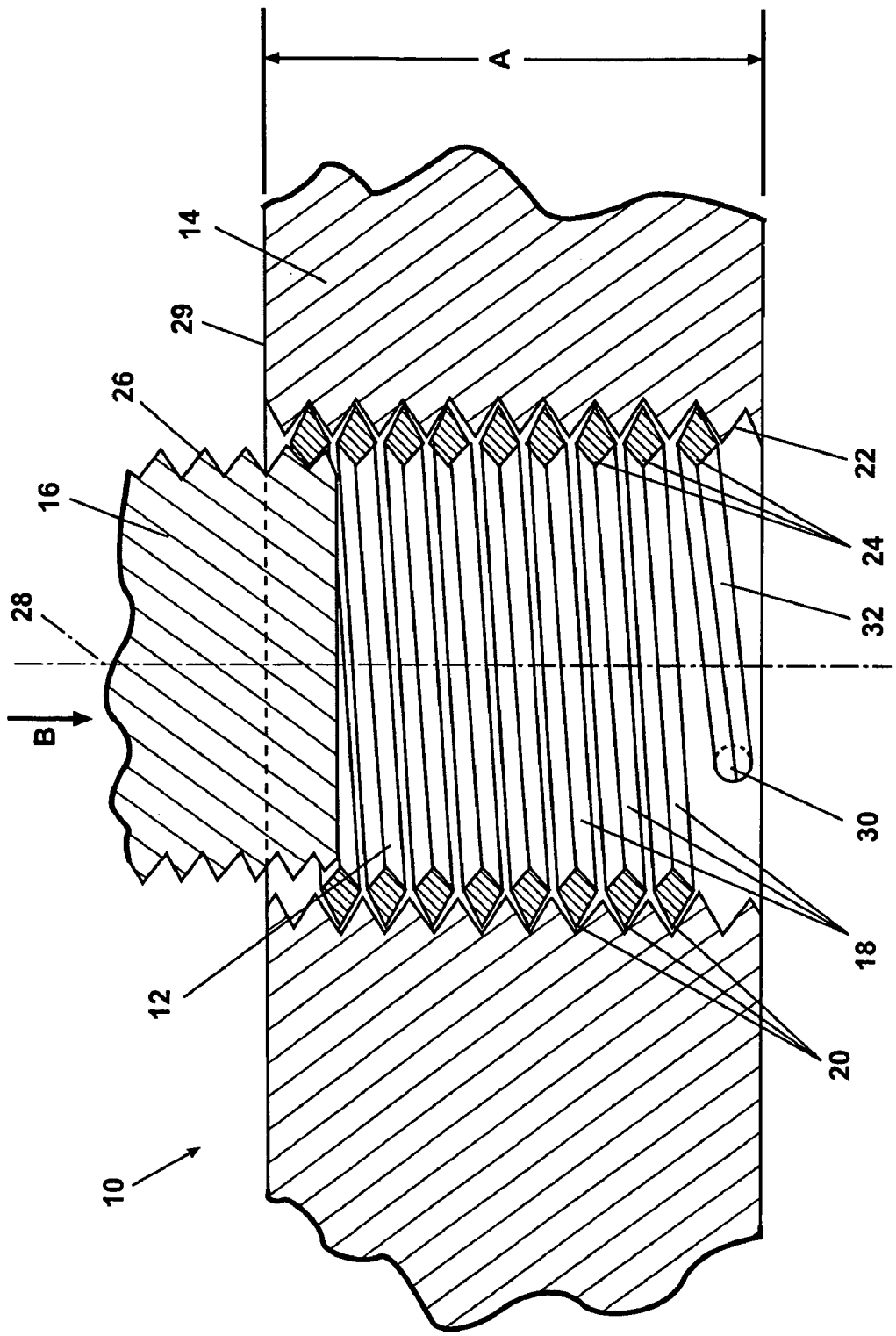
FIG. 1 is a cross sectional view showing a tanged screw thread insert with improved removability of the present invention inserted into a receiving member and having a threaded fastener partially inserted therein.

According to a preferred embodiment of a tanged screw thread insert of the present invention and referring to FIG. 1, an assembly 10 includes a helical insert 12 frictionally and rotatably received within a receiving member 14. Receiving member 14 can be a plate or sheet, a casting or molding, etc. Materials for receiving member 14 which benefit from the use of an insert 12 are generally materials including polymeric materials or the "soft" metals such as copper, aluminum, magnesium, etc., which do not have a tensile strength sufficient to prevent tear-out of a fastener 16 if fastener 16 is engaged only with receiving member 14. Insert 12 is therefore made of a higher tensile strength and harder material than receiving member 14, such as a steel, including stainless or spring steel. Fastener 16 can be any type of threaded fastener such as a screw or bolt, etc. In exemplary use, fastener 16 can provide hold-down capability to engage another item (not shown) to receiving member 14, or can act as an electrical contact post or electrical connection for receiving member 14.

Insert 12 is generally completely received within a thickness "A" of receiving member 14 in a general direction "B". Insert 12 includes a continuous, helical-shaped coil, herein described for simplicity as a plurality of coil sections 18. Coil sections 18 each include an outer surface 20 having a thread-shape which engage a plurality of receiving threads 22 pre-tapped or formed in receiving member 14. Coil sections 18 each also include an inner surface 24 which are thread-shaped and sized to engage a plurality of threads 26 of fastener 16. Insert 12, fastener 16 and receiving threads 22 are coaxially aligned on a longitudinal axis 28. Longitudinal axis 28 is preferably aligned substantially perpendicular to at least a receiving face 29 of receiving member 14, but can be angled with respect to receiving face 29 or a central axis through receiving member 14 if receiving member 14 is formed in a curved shape. A tang 30 connects to and extends radially inward from a first coil end section 32 of coil sections 18.

Figure 2:
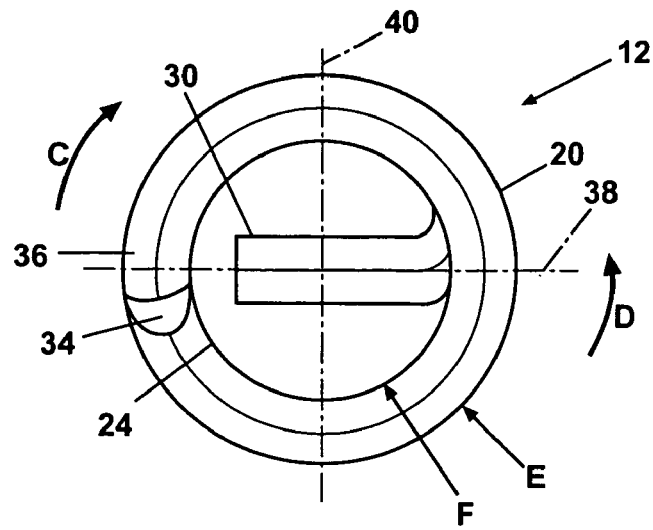
FIG. 2 is a top plan view of the tanged screw thread insert of the present invention.
Figure 3:
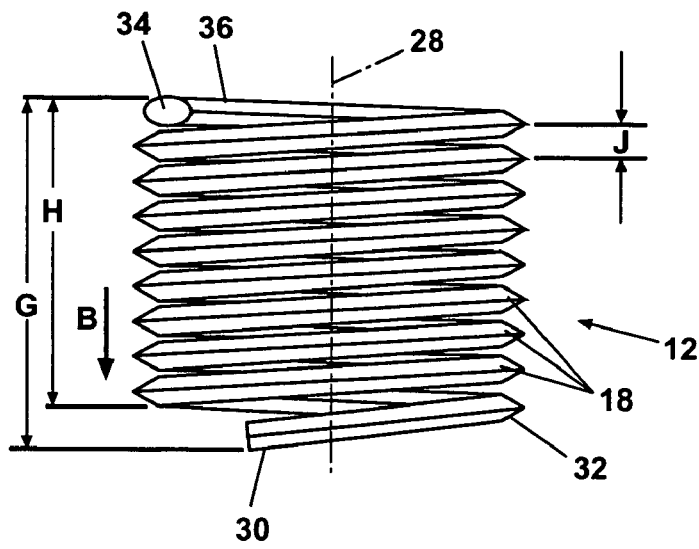
FIG. 3 is a side elevational view of the insert of FIG. 2.
Figure 4:
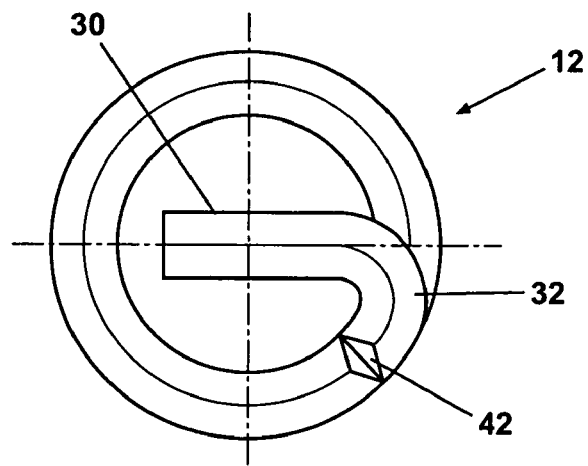
FIG. 4 is a bottom plan view of the insert of FIG. 1.

Referring generally to FIGS. 2 through 4, insert 12 is installed in a clockwise direction "C" and removed in a counterclockwise direction "D". Directions "C" and "D" can also be reversed if a reverse or left-hand threaded insert 12 is desired. Each of coil sections 18 have an outer diameter "E" defined by outer surface 20, and an inner diameter "F" defined by inner surface 24. Outer diameter "E" is sized to frictionally engage with receiving threads 22. Inner diameter "F" is sized to permit inner surfaces 24 to receive and engage threads 26. A finished end 34 is created at a distal end of a coil second end section 36. Coil second end section 36 is oppositely positioned from coil first end section 32. Finished end 34 is created in a separate operation such as by grinding, lapping, cold-heading, milling, etc. Tang 30 is preferably created by bending a portion of coil first end section 32 radially inward and substantially perpendicular to longitudinal axis 28 until tang 30 is coaxial to a first radial axis 38. First radial axis 38 is oriented substantially perpendicular to a second radial axis 40. Both first and second radial axes 38, 40 intersect at longitudinal axis 28. A deformation or notch 42 is also created in coil first end section 32.

As specifically shown in reference to FIGS. 1, 3 and 4, insert 12 has a total height "G" which is preferably less than thickness "A" of receiving member 14. Notch 42 is provided in coil first end section 32 to provide a fracture or failure point, allowing removal of tang 30 by further forcing tang 30 in direction "B" after insert 12 is frictionally seated in receiving member 14. This permits full insertion of fastener 16 through height "G" of insert 12 and thickness "A" of receiving member 14. If tang 30 is removed, a working height "H" of insert 12 results. Each coil section 18 is separated from each proximately located coil section 18 by a pitch "J", which corresponds to a pitch of receiving threads 22.

Referring generally to FIGS. 1 through 4, assembly 10 is created by grasping tang 30 with a tool (not shown) inserted within insert 12, aligning outer surfaces 20 with receiving threads 22, and rotatably inserting insert 12 in clockwise direction "C" into receiving member 14. Insert 12 is rotated and thereby translated in direction "B" until insert 12 is positioned as shown in FIG. 1. Threads 26 of fastener 16 are then aligned with inner surfaces 24 of coil sections 18 and fastener 16 is rotatably engaged with insert 12 in direction "B". A depth of engagement of fastener 16 within insert 12 can vary depending on the materials selected and the holding requirements of assembly 10.

With further reference to FIGS. 1 through 4, insert 12 is removable from receiving member 14 if no fastener 16 is present, or after removal of fastener 16. A second tool (not shown) is inserted into insert 12 which frictionally contacts one or more of the inner surfaces 24. Insert 12 is then rotated in the counterclockwise direction "D". During removal of insert 12, finished end 34 smoothly slides against receiving threads 22 which prevents galling or damage to receiving threads 22.

Figure 5:
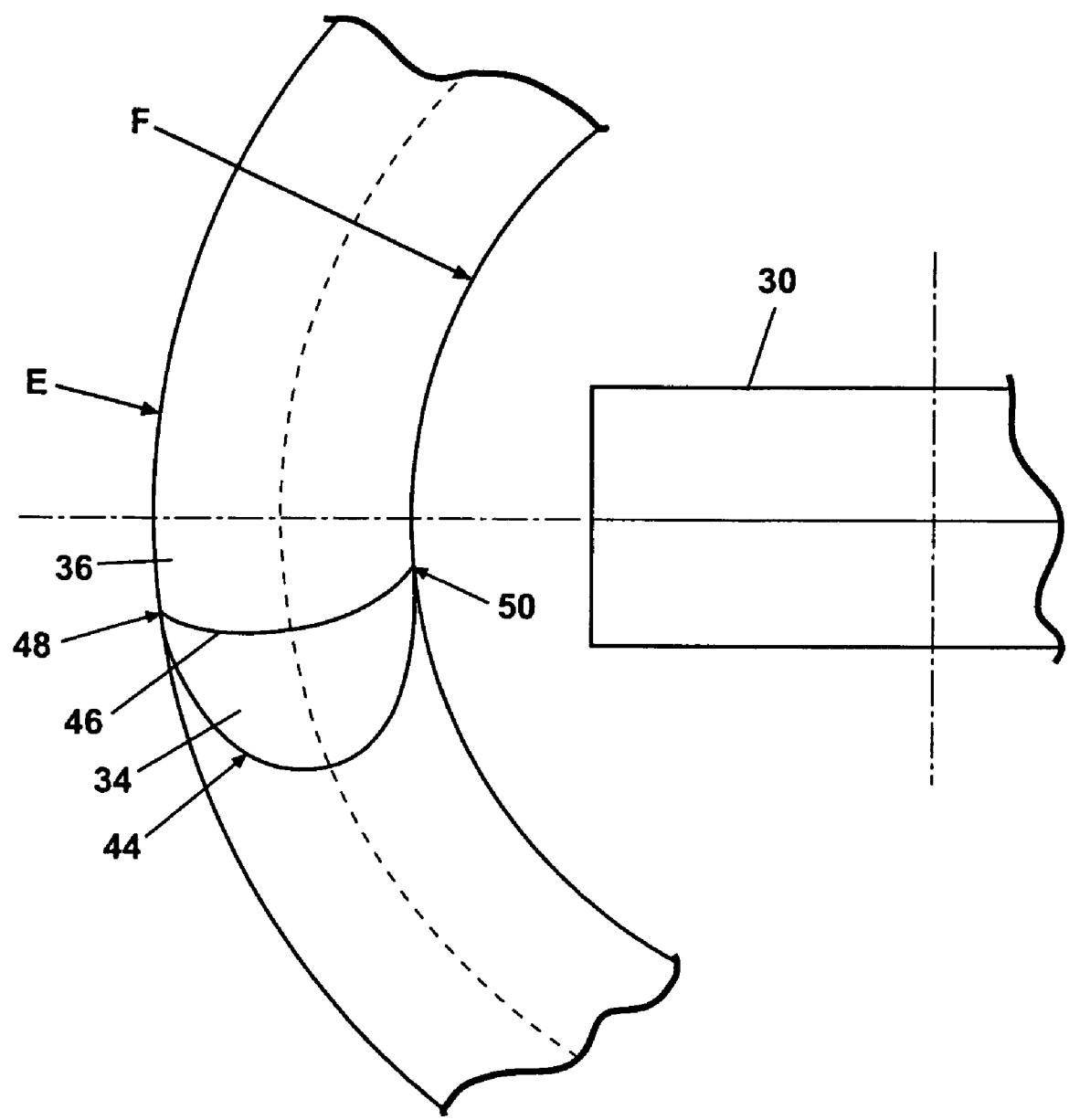
FIG. 5 is a top plan view of a continuous curved surface created at a distal end of a tanged screw thread insert of the present invention.

Referring next to FIG. 5, finished end 34 of coil second end section 36 includes a continuously curved surface 44 having no sharp corners, created by one of the processes previously described herein. In one preferred embodiment, continuously curved surface 44 tangentially meets outer surface 20 and inner surface 24 at a first and second tangent point 48 and 50, respectively. A junction line 46 is therefore present only where an intersection of continuously curved surface 44 meets coil second end section 36 between the first and second tangent points 48 and 50. Tangent point 48 therefore provides a smooth interface between coil second end section 36 and receiving threads 22.

Figure 6:
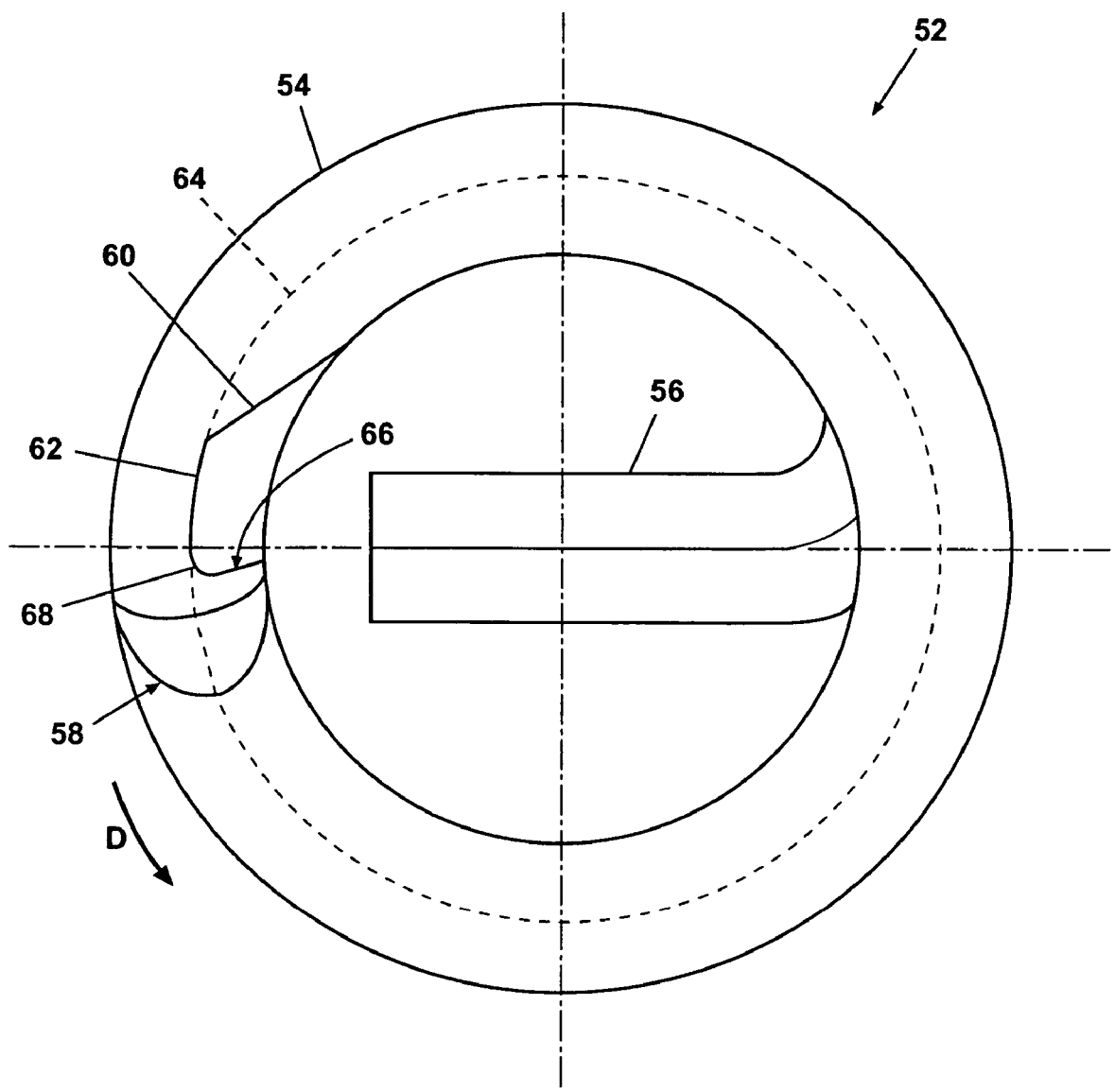
FIG. 6 is a top plan view of another preferred embodiment of a tanged screw thread insert of the present invention.

Referring now to FIG. 6, according to another preferred embodiment of the present invention, a helical insert 52 includes a plurality of helical coil sections 54, similar to coil sections 18. A tang 56, similar to tang 30 and a continuously curved surface 58, similar to continuously curved surface 44 are also provided. Insert 52 also includes a recess 60 proximate to continuously curved surface 58. Recess 60 includes an inner wall 62 positioned substantially at a coil centerline 64. A contact surface 66 provides a surface for a tool (not shown) such as a screwdriver blade to engage insert 52 and rotate insert 52 in counterclockwise direction "D" for removal of insert 52. A radial corner 68 transitions the inner wall 62 to the contact surface 66. Recess 60 functions similar to removal notches 18 disclosed in U.S. Pat. No. 6,726,421 to Giannakakos et al., issued Apr. 27, 2004, and commonly owned by the assignee of the present invention, the disclosure of which is incorporated herein by reference.

A tanged screw thread insert with improved removability of the present invention provides several advantages. By retaining a substantially constant outside diameter of the individual coil segments, removal of the coil presents a substantially constant contact diameter against the threads of the receiving member, which reduces the possibility of an out-of-round coil segment causing frictional damage to the threads. By providing a continuously curving distal end surface at a second end of the last coil segment, a smooth surface is presented during removal of the insert which reduces the chance of frictional damage to the threads of the receiving member.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A thread insert, comprising:
    a helical-shaped insert having a plurality of coil sections each defining an inner and an outer surface, the plurality of coil sections further including opposing first and second coil end sections;
    a convex rounded finished terminal end of the second coil end section;
    a continuously curved convex surface operably located at the rounded finished terminal end of the second coil end section that blends the inner surface and the outer surface of the second coil end section; and
    a tangent point operably located where the continuously curved convex surface tangentially meets the outer surface of the second coil end section, wherein the intersection between the continuously curved convex surface and the outer surface meet at an obtuse angle.

2. The thread insert of claim 1, further comprising a removable tang extending from the first coil end section.

3. The thread insert of claim 2, further comprising a notch disposed in the first coil end section proximate to the tang and positioned between the inner and outer surfaces.

4. The thread insert of claim 1, wherein each of the inner and outer surfaces define a thread-shape.

5. The thread insert of claim 1, wherein the insert further comprises a steel material.

6. The thread insert of claim 1, further comprising a second tangent point operably created where the continuously curved surface tangentially meets the inner surface of the second coil end section.

7. A thread insert, comprising:
    a helical-shaped insert defining a plurality of coil sections including opposing first and second coil end sections;
    each coil section having an inner surface and an outer surface defining a thread shape;
    a removable tang radially extending inwardly from the first coil end section;
    a rounded finished terminal end of the second coil end section, the finished terminal end having a continuously curved transverse convex surface at the rounded finished terminal end to ease removal of said insert that blends the inner surface and the outer surface of the second coil end section;
    a tangent point located where the continuously transverse curved convex surface tangentially meets the outer surface of the second coil end section at an obtuse angle; and
    a notch disposed in the first coil end section proximate to the tang and positioned between the inner and outer surfaces, wherein the tang is removable from the insert by mechanical failure at the notch.

8. The thread insert of claim 7, further comprising a second tangent point operably created where the continuously curved surface tangentially meets the inner surface of the second coil end section.

9. A thread insert, comprising:
    a helical-shaped insert defining a plurality of coil sections including opposing first and second coil end sections and a coil longitudinal axis;
    each coil section having an inner surface and an outer surface defining a thread shape, said outer surface defining an intersection configured to engage a surface of a threaded hole;
    a removable tang inwardly radially extending from the first coil end section and substantially transverse to the coil longitudinal axis;
    a rounded finished terminal end of the second coil section, said rounded finished terminal end being a continuously curved convex surface operably located at the rounded finished terminal end of the second coil section that blends the inner surface and the outer surface of the second coil end section;
    a tangent point operably located where the continuously curved surface tangentially meets the outer surface of the second coil end section, wherein the intersection between the continuously curved convex surface and the outer surface meet at an obtuse angle; and
    a V-shaped notch disposed in the first coil end section proximate to the tang and positioned between the inner and outer surfaces, the V-shaped notch operable to create a failure point in the first coil section for removal of the tang.

10. A method for creating a thread insert, the thread insert including a helical-shaped coil defining a plurality of coil sections including opposing first and second coil end sections, each coil section having an inner and an outer surface said outer surface defining an intersection configured to engage a threaded surface of a hole, the second coil end section having a rounded finished terminal end, the method comprising:
    creating a continuously curved convex surface at the rounded finished terminal end of the second coil end section by blending the inner surface and the outer surface of the second coil end section; and
    tangentially joining the continuously curved convex surface of the rounded finished terminal end to the outer surface of the second coil end section to operably create a tangent point.

11. The method of claim 10, further comprising radially inwardly extending a removable tang from the first coil end section.

12. The method of claim 11, further comprising creating a notch proximate to a bend joining the tang to the first coil end section.

13. The method of claim 10, further comprising tangentially joining the continuously curved surface to the inner surface of the second coil end section to operably create a second tangent point.

14. The method of claim 10, further comprising creating a thread shape at each of the outer and inner surfaces of the coil sections.

15. The method of claim 10, wherein tangentially joining the continuously curved surface to the outer surface of the second coil end section forms a non-sharp tangent point.

* * * * *